United States Patent
Chang

(10) Patent No.: US 8,919,665 B2
(45) Date of Patent: Dec. 30, 2014

(54) OUTDOOR SHOWER DEVICE

(75) Inventor: Chia-Lin Chang, Taipei (TW)

(73) Assignee: GDL International Ltd., Taipei (TW)

( * ) Notice: Subject to any disclaimer, the term of this patent is extended or adjusted under 35 U.S.C. 154(b) by 579 days.

(21) Appl. No.: 13/246,970

(22) Filed: Sep. 28, 2011

(65) Prior Publication Data

US 2012/0111971 A1    May 10, 2012

(30) Foreign Application Priority Data

Nov. 10, 2010    (TW) ............................... 99221795 U

(51) Int. Cl.
*B05B 1/24* (2006.01)
*F24H 1/06* (2006.01)
*F24H 1/08* (2006.01)
*F24H 9/20* (2006.01)

(52) U.S. Cl.
CPC .. *F24H 1/06* (2013.01); *F24H 1/08* (2013.01); *F24H 9/2021* (2013.01); *Y02B 30/108* (2013.01)
USPC ............................................ 239/128; 239/69

(58) Field of Classification Search
CPC .......... B05B 1/24; B05B 12/004; B05B 12/12
USPC ............................ 239/128, 71, 72, 73, 67, 69
See application file for complete search history.

(56) References Cited

U.S. PATENT DOCUMENTS

| | | | |
|---|---|---|---|
| 6,286,764 B1 * | 9/2001 | Garvey et al. ............... | 236/12.12 |
| 2004/0139930 A1 * | 7/2004 | Frasure et al. ............. | 122/367.4 |
| 2012/0031498 A1 * | 2/2012 | Carmel et al. ................... | 137/2 |

* cited by examiner

*Primary Examiner* — Davis Hwu
(74) *Attorney, Agent, or Firm* — Ming Chow; Sinorica, LLC

(57) ABSTRACT

An outdoor shower device, comprising a water storage module, a power supply module, a heating module, a control module, a water supply module and an alarm module, wherein the water storage module is employed for water source storage, the control module controls the heating module to heat the water based on the water temperature, and then the water supply module provides the heated water for use. Furthermore, the power supply module provides electric power required for integral operations and enables the alarm module to determine the water level; in case the water level is exceedingly low, it is possible to present blinking display signal and audio alarm sound to inform the user of such a low water level thereby allowing the user to more effectively apply the outdoor shower device of the present invention.

10 Claims, 3 Drawing Sheets

OUTDOOR SHOWER DEVICE

BACKGROUND OF THE INVENTION

1. Field of the Invention

The present invention relates to an outdoor shower device; in particular, it relates to a outdoor shower device capable of keeping a constant water temperature thereby allowing a user to take a shower outdoors or at countryside with warm water of constant temperature.

2. Description of Related Art

For numerous urbanites worldwide, field camping is one of preferred outdoor recreation activities, and in order to thoroughly enjoy contacts with environments differing from their daily lives, it is common to choose certain natural, sparsely populated camping locations, especially undeveloped encampment sites which are most favorable for some camping fans. However, such undeveloped encampment sites usually lack of tap water or electric power supplies. Hence, upon taking a shower, it is typical to draw river water streams or else may need to use a water tank or barrel to specifically carry water for direct body washing. In winter or cooler climates, whereas, it is not acceptable for general people to take a shower directly with cold water, unless that they take a large metal container along with them for loading water and then heat water with wood fire thereby allowing users to clean their bodies with warm water. But, in terms of field camping, such a solution requires tedious preparations beforehand for conveyance of quite a few equipments to the encampment sites so as to fulfill the expectations on taking a shower of hot water. Accordingly, it is pretty inconvenient for many camping fans and is also an issue that currently many camping utility manufacturers intend to resolve.

Therefore, it would be the best solution to offer an outdoor shower device which is well adapted for water storage and heating in field environments and allows the user to take a shower with water source of constant temperature.

SUMMARY OF THE INVENTION

The objective of the present invention is to provide an outdoor shower device capable of offering a water source of constant temperature to a user for body cleaning as applied in field environments.

An outdoor shower device according to the present invention can achieve the aforementioned objective, comprising a water storage module, a power supply module, a heating module, a control module, a water supply module and an alarm module, wherein the water storage module is employed for water source storage, the control module controls the heating module to heat the water based on the water temperature, and then the water supply module provides the heated water for use. Furthermore, the power supply module provides electric power required for integral operations and, through the alarm module, allows to present blinking display and audio alarm in terms of situations such as abnormal heating temperature, exceedingly low water level and the like thereby informing the user of occurrences of erroneous conditions.

More specifically, the interior of the above-said water storage module is configured with a temperature sensor module and a water level detector module.

More specifically, the above-said control module includes a temperature control module, a protection control module and a water supply control module, wherein the protective control module has an over-current protection circuit and an automatic deactivation circuit.

More specifically, the above-said alarm module includes a display light indicator and an audio output module, and in case that the heating temperature is abnormal or the water level becomes overly low, the display light indicator and the audio output module can respectively generate blinking signal and alarm sound in order to warn the user that the heating temperature becomes abnormal or the water level has reaches a low water level threshold.

DETAILED DESCRIPTION OF THE PREFERRED EMBODIMENTS

The aforementioned and other technical contents, aspects and effects in relation with the present invention can be clearly appreciated through the detailed descriptions concerning the preferred embodiments of the present invention in conjunction with the appended drawings.

Figure 1A:
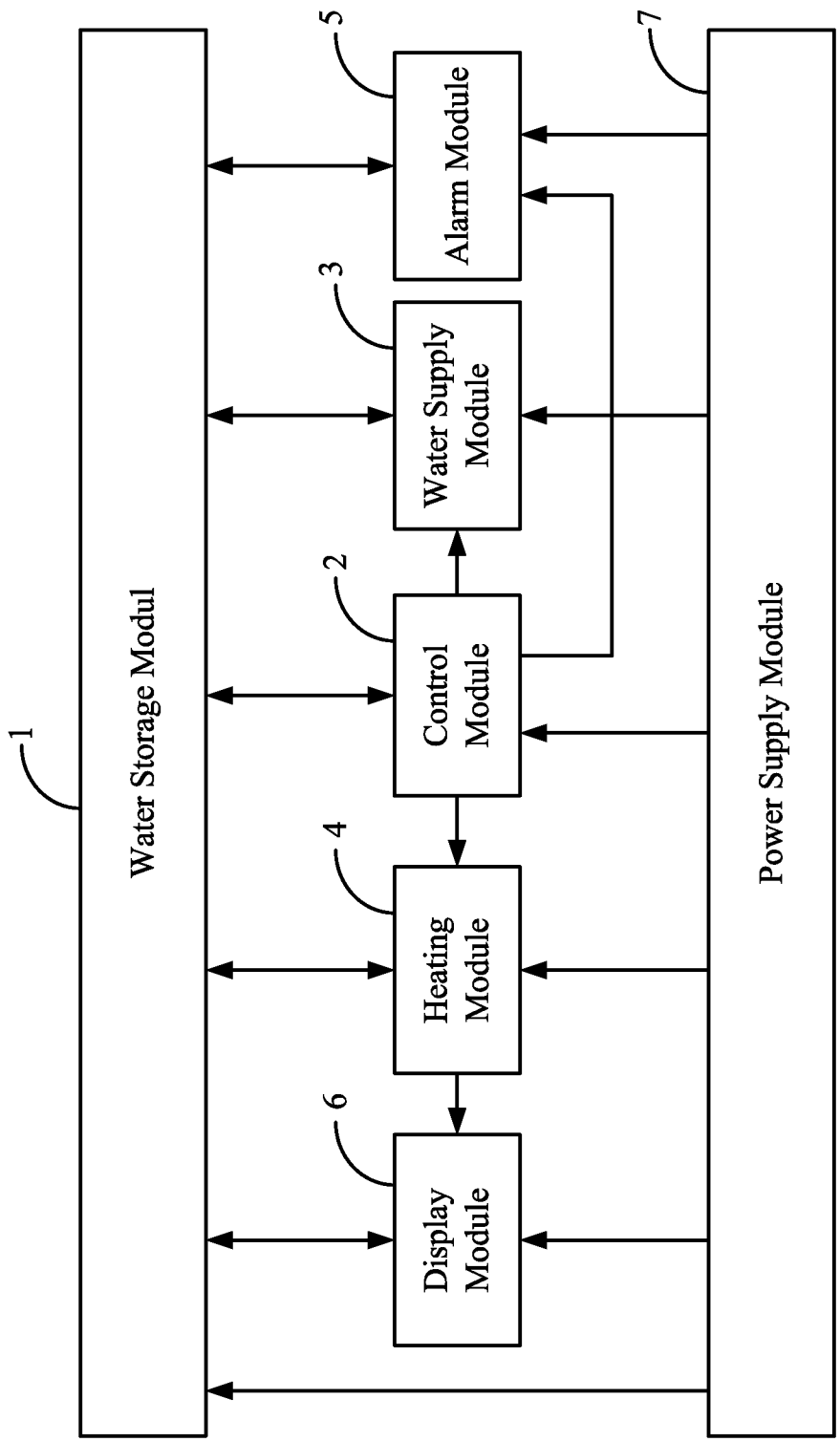
FIG. 1A shows an integral architecture diagram of an outdoor shower device according to the present invention.
Figure 1B:
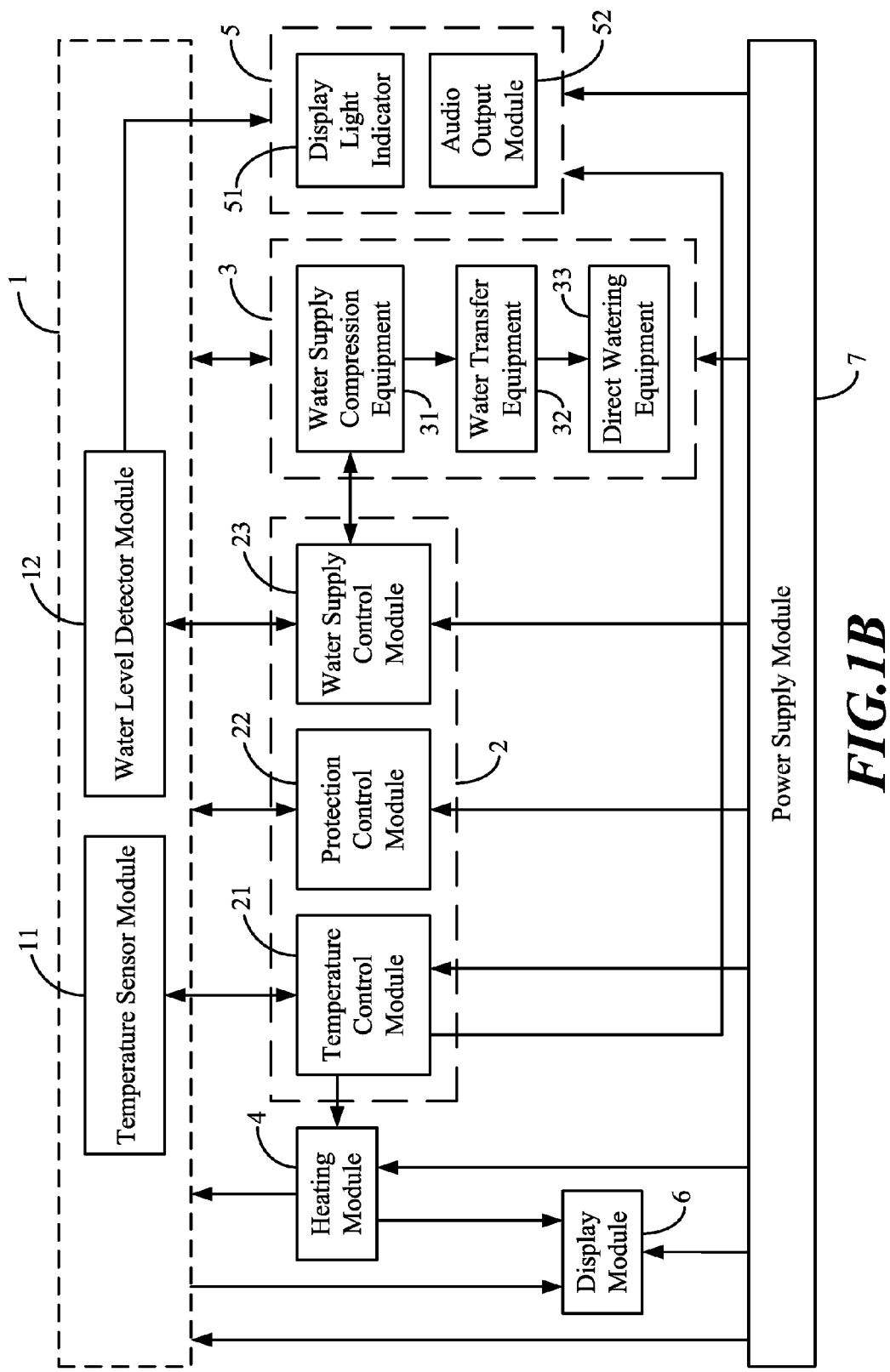
FIG. 1B shows an integral architecture diagram of an outdoor shower device according to the present invention.

Refer now to FIGS. 1A and 1B, wherein integral architecture diagrams for an outdoor shower device according to the present invention are shown, and it can be seen from these diagrams that the outdoor shower device according to the present invention comprises:

a water storage module 1, which is a container enabling heat preservation feature and employed for water source storage;

a control module 2, which is connected to the water storage module 1 in order to control the temperature of the stored water source and to further control water supply and heating operations of the water source stored in the water storage module 1; in addition, the control module 2 can be manually set to a heating threshold temperature by a user;

a water supply module 3, which is connected to the water storage module 1 and the control module 2 and controllable by means of the control module 2 thereby performing water supply output of the water source stored in the water storage module 1 through the water supply module 3;

a heating module 4, which is connected to the water storage module 1 and the control module 2 and controllable by means of the control module 2 thereby performing water source heating on the water source stored in the water storage module 1 through the heating module 4;

an alarm module 5, which is connected to the water storage module 1 and the control module 2 so as to alarm the user that the water amount has reached a lower level threshold or to reflect that an abnormal heating temperature has occurred and detected;

a display module 6, which is connected to the water storage module 1 and the heating module 4 and allows to present current operation states relating to such as equipment power supply, heating, low water level and the like;

a power supply module 7, which is connected to the water storage module 1, the control module 2, the water supply module 3, the heating module 4, the alarm module 5 and the display module 6 thereby providing electric power required for integral operations.

It should be noticed that the interior of the water storage module 1 is configured with a temperature sensor module 11 and a water level detector module 12, wherein the temperature sensor module 11 and the water level detector module 12 are installed within the water storage module body meanwhile, the temperature sensor module 11 is capable of sensing the temperature of the water source stored therein, and the water level detector module 12 can detect the water level of the water source.

It should be noticed that the water storage module 1 has a water inlet 13 (refer to FIG. 2), and the inside of the water inlet 13 includes a filter 14 such that bulky sundries, e.g., tree branches, leaves or pebbles, can be effectively filtered out upon drawing creek streams or lake water by means of the water storage module 1.

It should be noticed that the water storage module 1 can be a soft enclosed container or a hard enclosed container, but soft material does provide preferable folding and hand carry features.

It should be noticed that the control module 2 includes a temperature control module 21, a protection control module 22 and a water supply control module 23, wherein the temperature control module 21, the protection control module 22 and the water supply control module 23 are connected to the power supply module 7.

It should be noticed that the temperature sensor module 11 is connected to the temperature control module 21, and the temperature control module 21 is further connected to the heating module 4, wherein the temperature sensor module 11 senses the temperature of the stored water source and inputs the result to the temperature control module 21 thereby determining whether it is required to perform a heating operation (if it is below the heating threshold temperature, the heating module 4 is activated; otherwise, the temperature is above the heating threshold temperature, the heating module 4 is deactivated) so as to heat up the water source stored in the water storage module 1 by means of the heating module 4; in case that the temperature control module 21 receives a temperature abnormal signal from the temperature sensor module 11 (e.g., unable to heat to a preset temperature or erroneously exceeding a preset temperature), the operations of the heating module 4 are deactivated and a control signal is outputted to the alarm module 5 to warn the user the occurrence of abnormality through blinking display and audio alarm.

It should be noticed that the water storage module 1 is connected to the water supply control module 23 and the water supply module 3 in order to control the water source in the water storage module 1 thereby facilitating water output through the water supply module 3.

It should be noticed that the water storage module 1 is connected to a protection control module 22 and the protection control module 22 includes an over-current protection circuit (e.g., a fuse) and an automatic deactivation circuit thereby preventing accidents like over-current burnout; besides, in case of water shortage in the water storage module 1, it is possible to stop heating and water supply operations by means of the automatic deactivation circuit.

It should be noticed that the water supply module 3 includes a water supply compression equipment 31, a water transfer equipment 32 and a direct watering equipment 33, wherein the water supply compression equipment 31 can be a compression equipment such as a pump, the water transfer equipment 32 can be a flexible hose and so forth, and the direct watering equipment 33 can be a watering equipment like a showerhead configured with a button switch 331.

Herein the water supply control module 23 can drive the water supply compression equipment 31 to draw the water source inside the water storage module 1 which is then transferred to the direct watering equipment 33 through the water transfer equipment 32 in order to output the stored water source; furthermore, the direct watering equipment 33 can be a showerhead configured with a button switch 331 thereby freely controlling the watering operation by pressing down the button switch so as to improve convenience in use for shower taking and reduce water waste.

It should be noticed that the heating module 4 can automatically stop heating when the temperature of the water source within the water storage module 1 becomes above a heating threshold temperature; while the temperature of water source is determined to be below the heating threshold temperature, the heating process can be automatically activated thereby maintaining such a heating threshold temperature.

It should be noticed that the heating module 4 can be of electric power heating by means of resistive heat lines, or otherwise of gas burning heating using canned gas.

It should be noticed that the alarm module 5 includes a display light indicator 51 and an audio output module 52, wherein the display light indicator 51 and the audio output module 52 are connected to the power supply module 7.

It should be noticed that the water level detector 12 is connected to the display light indicator 51 and the audio output module 52 such that, when the water level detector 12 detects that the water level inside the water storage module 1 is exceedingly low, it is possible to generate blinking light signal and alarm sound respectively by means of the display light indicator 51 and the audio output module 52 in order to warn the user that the water amount has reached a low level threshold.

It should be noticed that the power supply module 7 can be of vehicle battery power, portable power supply, grid power supply or solar cell power supply.

Figure 2:
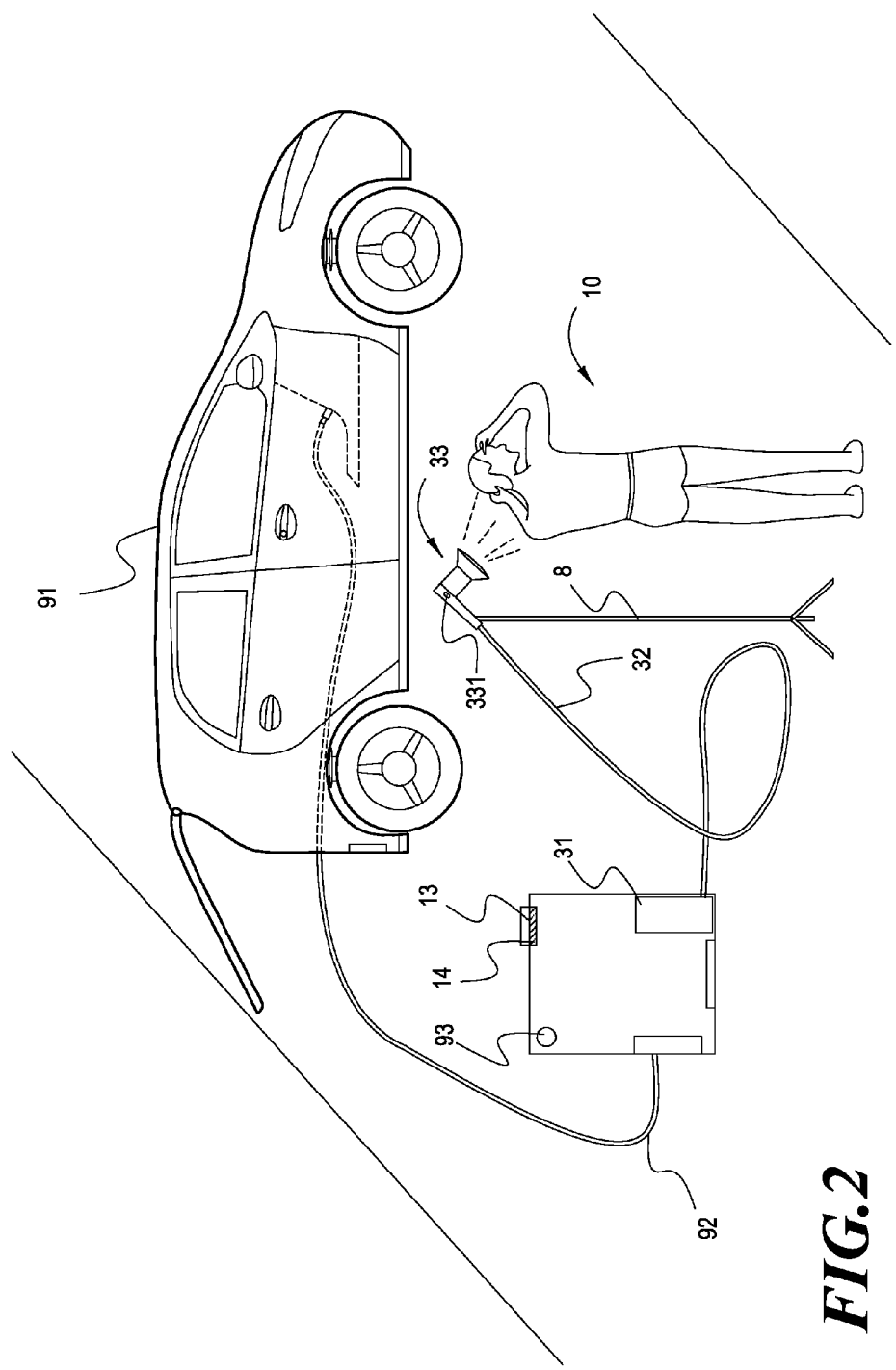
FIG. 2 shows a diagram for an embodiment of an outdoor shower device according to the present invention.

It should be noticed that the steps of using the outdoor shower device according to the present invention are:

1. installing a direct watering equipment 33 (a showerhead) and a water transfer equipment 32 (a pipe set) to the water storage module 1, placing the water storage module 1 on the ground and fixedly supporting the direct watering equipment 33 (a showerhead) with a framing structure 8;

2. pouring creek water or lake water into the water storage module 1 through the water inlet 13 and preliminarily filtering with the filter 14 installed therein, and then closing up the cover (not shown) in order to keep the enclosure condition of the water storage module 1;

3. activating the outdoor shower device upon attaching the external power line 92 to a cigarette lighter slot of the camping vehicle 91 and setting a heating threshold temperature through an external temperature control switch 93, thereby automatically activating the heating module in case that the detected water temperature is below the heating threshold temperature and indicating "Heating" message by means of the display module 6 until the water temperature reaching the heating threshold temperature, thus accordingly deactivating the heating module 4;

4. upon taking a shower by the user 10, pressing down the button switch 331 on the direct watering equipment 33 (a showerhead) thus making the water supply compression equipment 31 (a sinkable pump) power on thereby drawing warm water, transferring through the water transfer equipment 32 (a pipe set) and then spraying warm water via the direct watering equipment 33 (a showerhead); by pressing down once again the button switch 331, deactivating the water supply compression equipment 31 (a sinkable pump) to stop electric power and water supply (refer to FIG. 2);

5. during the shower time, generating the blinking light signal and smooth alarm sound in case of overly low water level inside the water storage module 1 or abnormal heating temperature detected by the control module so as to remind the user of imminent water shortage or occurrence of abnormal temperature.

Compared with prior art, the outdoor shower device provided by the present invention further offers the following advantages:

1. The present invention provides a field water supply device enabling heat preservation control based on the fact that general camping players drive their own cars so it is possible to enjoy the pleasure of warm water showering in the field simply by inserting the equipment power plug into the cigarette lighter slot on the car thereby obtaining the electric power required for integral operations; furthermore, the present invention also allows the direct use of 110V AC or 220V AC grid power supply as the power source.

2. The present invention includes a low water level alarm mechanism in order to prevent water shortage problem without warning during shower time; in addition, the present invention also comprises a circuit overload protection function thereby effectively maintaining user security.

3. The present invention controls the feeding or interruption of water supply with one single switch on the direct watering equipment (showerhead) thereby facilitating convenient and simple operation in use; besides, the water storage module can be a flexible enclosed container so as to offer easy folding and hand carry features and reduce occupied space within a vehicle or a residence.

4. The present invention does not require special maintenance, but left dry and cleaned after use for suitable accommodation.

By way of the aforementioned detailed descriptions for the preferred embodiments according to the present invention, it is intended to better illustrate the characters and spirit of the present invention rather than restricting the scope of the present invention to the preferred embodiments disclosed in the previous texts. Contrarily, the objective is to encompass all changes and effectively equivalent arrangements within the scope of the present invention as delineated in the following claims of the present application.

What is claimed is:

1. An outdoor shower device, comprising:
a water storage module, which is a container enabling heat preservation feature and employed for water source storage;
a control module, which is connected to the water storage module in order to control the temperature of the stored water source and to further control water supply and heating operations of the water source stored in the water storage module; in addition, the control module can be manually set to a heating threshold temperature by a user;
a water supply module, which is connected to the water storage module and the control module and controllable by means of the control module thereby performing water supply output of the water source stored in the water storage module through the water supply module;
an alarm module, which is connected to the water storage module so as to alarm the user that the water amount has reached a lower level threshold or an abnormal temperature has occurred;
a display module, which is connected to the water storage module and the heating module and can display current operation states; and
a power supply module, which is connected to the water storage module, the control module, the water supply module, the heating module, the alarm module and the display module thereby providing electric power required for integral operations;
the water storage module has a water inlet and a filter is installed inside the water inlet;
the water storage module has a temperature sensor module and a water level detector module, the temperature sensor module senses the temperature of water source stored in the water storage module and the water level detector module detects the water level of water source stored in the water storage module;
the alarm module includes a display light indicator and an audio output module; and
the water supply module has a direct watering equipment, a water transfer equipment and a water supply compression equipment, and the direct watering equipment is a watering equipment with a button switch.

2. The outdoor shower device according to claim 1, wherein the water storage module is a soft enclosed container or a hard enclosed container.

3. The outdoor shower device according to claim 1, wherein the control module includes a temperature control module, a protection control module and a water supply control module.

4. The outdoor shower device according to claim 3, wherein the temperature control module is connected to the temperature sensor module of the water storage module and the temperature control module is also connected to the heating module, wherein the temperature of water source acquired by the temperature sensor module is inputted to the temperature control module to determine whether it is required to perform heating operation and heat the water source stored in the water storage module by means of the heating module.

5. The outdoor shower device according to claim 3, wherein the temperature control module is connected to the temperature sensor module in the water storage module and the temperature control module is also connected to the heating module, and in case that the temperature control module receives a temperature abnormal signal from the temperature sensor module, the operations of the heating module are deactivated and a control signal is outputted to the alarm module thereby presenting blinking display and audio alarm.

6. The outdoor shower device according to claim 3, wherein the protection control module is connected to the water storage module and has an over-current protection circuit and an automatic deactivation circuit.

7. The outdoor shower device according to claim 3, wherein the water supply control module is connected to the water supply module in order to control the water source of the water storage module and output the water source through the water supply module.

8. The outdoor shower device according to claim 1, wherein the display light indicator and the audio output module are connected to the water level detector module of the water storage module thereby blinking light signal and generating warning sound respectively by means of the display light indicator and the audio output module as the water level detector module detects that the water level in the water storage module is exceedingly low.

9. The outdoor shower device according to claim 1, wherein the heating module is of electric power heating or gas burning heating.

10. The outdoor shower device according to claim 1, wherein the power supply module is of vehicle power battery, portable power supply, grid power supply or solar cell power supply.

* * * * *